United States Patent
Kohli et al.

(10) Patent No.: US 6,252,600 B1
(45) Date of Patent: Jun. 26, 2001

(54) COMPUTER GRAPHICS SYSTEM WITH DUAL FIFO INTERFACE

(75) Inventors: Ashu Kohli, Austin; Christopher Edward Koob, Pflugerville; Thomas P. Lanzoni; James Anthony Pafumi, both of Leander; William Alan Wall; Jeffrey Allan Whaley, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/165,618

(22) Filed: Oct. 2, 1998

(51) Int. Cl.$^7$ .................................................. G06T 15/00
(52) U.S. Cl. ........................ 345/419; 345/506; 345/526
(58) Field of Search .................................. 345/419, 427, 345/591, 506, 526

(56) References Cited

U.S. PATENT DOCUMENTS

| | | | |
|---|---|---|---|
| 4,985,855 | 1/1991 | Aldrich et al. | 364/522 |
| 5,010,502 | 4/1991 | Diebel et al. | 364/522 |
| 5,297,241 | 3/1994 | Hirr, Jr. et al. | 395/127 |
| 5,329,615 | 7/1994 | Peaslee et al. | 395/162 |
| 5,371,849 | 12/1994 | Peaslee et al. | 395/162 |
| 5,394,524 | 2/1995 | Di Nicola et al. | 395/163 |
| 5,434,966 | 7/1995 | Nakazawa et al. | 395/161 |
| 5,555,366 | 9/1996 | Teig et al. | 395/161 |
| 5,649,080 | 7/1997 | Minakata | 395/127 |
| 5,649,230 | 7/1997 | Lentz | 395/872 |
| 5,701,444 | 12/1997 | Baldwin | 395/506 |
| 5,805,168 | * 9/1998 | Minakata | 345/427 |
| 5,815,165 | * 9/1998 | Blixt | 345/506 |
| 6,011,564 | * 1/2000 | Furuhashi et al. | 345/501 |
| 6,028,610 | * 2/2000 | Deering | 345/501 |

OTHER PUBLICATIONS

IBM Technical Disclosure Bulletin, vol. 33, No. 7, Dec. 1990, "Improved Dispatching in a Rendering Context Manager," pp. 131–134.

IBM Technical Disclosure Bulletin, vol. 35, No. 1B, Jun. 1992, "Multiple FIFOs for Improved Context Switching in Graphics Adapters," pp. 163–164.

* cited by examiner

*Primary Examiner*—Mark Zimmerman
*Assistant Examiner*—Huedung X. Cao
(74) *Attorney, Agent, or Firm*—Leslie A. VanLeeuwen; Bracewell & Patterson, L.L.P.

(57) ABSTRACT

A computer system has a graphics subsystem employing a rasterizer and a frame buffer, with a digital-to-analog converter for producing drive signals to a video display. A bus interface acts as a gateway between a PCI bus and the graphics subsystem; this interface manages commands and DMAs passing between the host processor and various parts of the graphics subsystem. Within the interface, two command FIFOs are employed, one for storing commands/data sent from the host for 2D display (window management) and another for 3D applications. Using two command FIFOs eliminates the need for host semaphore, FIFO draining, and the latency associated with these operations. Timers are provided in the interface, associated with the two command FIFOs, to manage and regulate the frequency with which the system automatically switches between 2D and 3D FIFO processing. Host intervention is minimized by use of a context macro store for holding locally the sequences for context save and context restore which are used repeatedly.

31 Claims, 5 Drawing Sheets

COMPUTER GRAPHICS SYSTEM WITH DUAL FIFO INTERFACE

RELATED CASE

This application discloses information also disclosed in the following copending application, filed herewith and assigned to the assignee of this application:

Ser. No. 09/165,619, for "Computer Graphics System with Explicit Management of Graphics Context," by Ashu Kohli et al.

BACKGROUND OF THE INVENTION

1. Technical Field

This invention relates to computer systems having a graphics interface, and more particularly to computer graphics systems, and more particularly to processing commands and data for graphics systems employing display windows with both 2D and 3D images.

2. Description of the Related Art

Computer graphics workstations are used to generate high-quality graphics images, often three-dimensional, and to run applications programs in a windowed environment. A windowed environment allows a display device to present the output from several applications on a single physical output medium, e.g., a CRT display or monitor. The output display of an application is typically presented in one or more "windows" in a windowed environment. One or more unique "contexts" may be associated with the application area of each window. The contexts define the properties and parameters of the window area for that application. Thus, context refers to the data used by a graphics system to control the rendering process, i.e., a process through which a displayable image is generated. To enhance performance, computer graphics systems are moving toward the use of multiple graphics threads, each thread potentially having its own graphics context.

Three dimensional (3D) clients are typically computationally intensive and demanding on system bus bandwidth, and the threads for 3D clients can run on multiple processors in an attempt to satisfy their requirement for host processing cycles. Whenever the graphics system switches between clients, the state information must be saved and restored at many places in the graphics pipeline.

Increasingly, computer graphics systems are supporting multiple 2D and 3D contexts. For example, a graphics system may have in one window a high quality rendering of an airplane being developed. In another window there may be an interactive dialog in which the designer can change the properties of the airplane or make inquiries about it. In yet another window there may be a clock, and in still another window an inter-office mailing application may be running. The X-Window System developed by M.I.T. is a well-known example of such a windowing system standard.

In a graphics system in which multiple 2D and 3D contexts must be supported, and quickly switched among, it is also important to maintain a high degree of user interactivity with minimum latency. All graphics pipelines experience pipeline latency, which is defined as the time required for a single primitive to traverse the pipeline. Previous graphics adapters provided only a single command store (e.g., a FIFO, see copending application Ser. No. 09/165,619) for 3D, 2D, and other host processes. This is not an efficient method to render the 2D and 3D processes as it requires the host to semaphore, and requires FIFO draining upon context switch. Also 2D and 3D processes use the FIFO differently; since 3D processes require large amounts of data to draw an object, they typically use DMA commands which cause the adapter to fetch data. On the other hand, 2D processes typically require small amounts of data, and so it is more efficient to use PIO graphics data, rather than use graphics data. But the single FIFO implementation requires that the host use a semaphore before dispatching PIO commands. The need for a host semaphore prior to dispatching PIO commands makes this a more expensive operation than a DMA. The single FIFO implementation also requires the host to explicitly manage the 3D-to-2D and 2D-to-3D context switch by effecting a context save and context restore.

The window operations which theoretically should be interactive with the user often force the user to wait while graphics primitives are being rendered. For example, the user may have to wait for a small window to pop up on the display while a high quality rendering of an airplane is being developed in another window. Since graphics pipelines and graphics systems are evolving to support more complex primitives and longer pipelines, pipeline latency now presents a prohibitive problem in the ongoing effort to increase pipeline throughput and efficiency. There is a long-felt need to reduce the need for complex host management, processor overhead, host semaphore, and FIFO draining. These needs have not been heretofore addressed satisfactorily by current implementations.

SUMMARY OF THE INVENTION

It is therefore one object of the present invention to provide an improved graphics display for a computer system, particularly an improved way of managing graphics state associated with multiple contexts, e.g., both 2D and 3D domains.

It is another object of the present invention to provide an improved computer graphics system involving context switching between 2D and 3D applications, with a minimum of pipeline latency associated with context switching.

It is yet another object of the present invention to provide a method of providing graphics context switching in a computer graphics system which allows optimum use of the host processor and fast graphics switches, with minimal overhead.

It is a further object of the invention to provide a graphics context switch arrangement which functions automatically, providing context saves and restores without intervention of the host processor.

The above as well as additional objects, features, and advantages of the present invention will become apparent in the following detailed written description.

According to one embodiment of the invention, a computer system has a graphics subsystem which employs a rasterizer and a frame buffer, with a digital-to-analog converter for producing drive signals to a video display. A bus interface acts as a gateway between a system bus such as a PCI bus and the graphics subsystem; this interface manages commands and DMAs passing between a host processor and various parts of the graphics subsystem. Within the interface, two command FIFOs are employed, one for storing commands/data sent from the host for 2D display (window management) and another for 3D applications. The use of two command FIFOs eliminates the need for host semaphore, FIFO draining, and the latency associated with these operations. Timers are provided in the interface, associated with the two command FIFOs, to manage and regulate the frequency with which the system automatically switches between 2D and 3D FIFO processing. To minimize host intervention and bus bandwidth use, a context macro store is provided for holding locally the sequences for context save and context restore which are used repeatedly.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment, when read in conjunction with the accompanying drawings, wherein:

DETAILED DESCRIPTION OF PREFERRED EMBODIMENT

Figure 1:
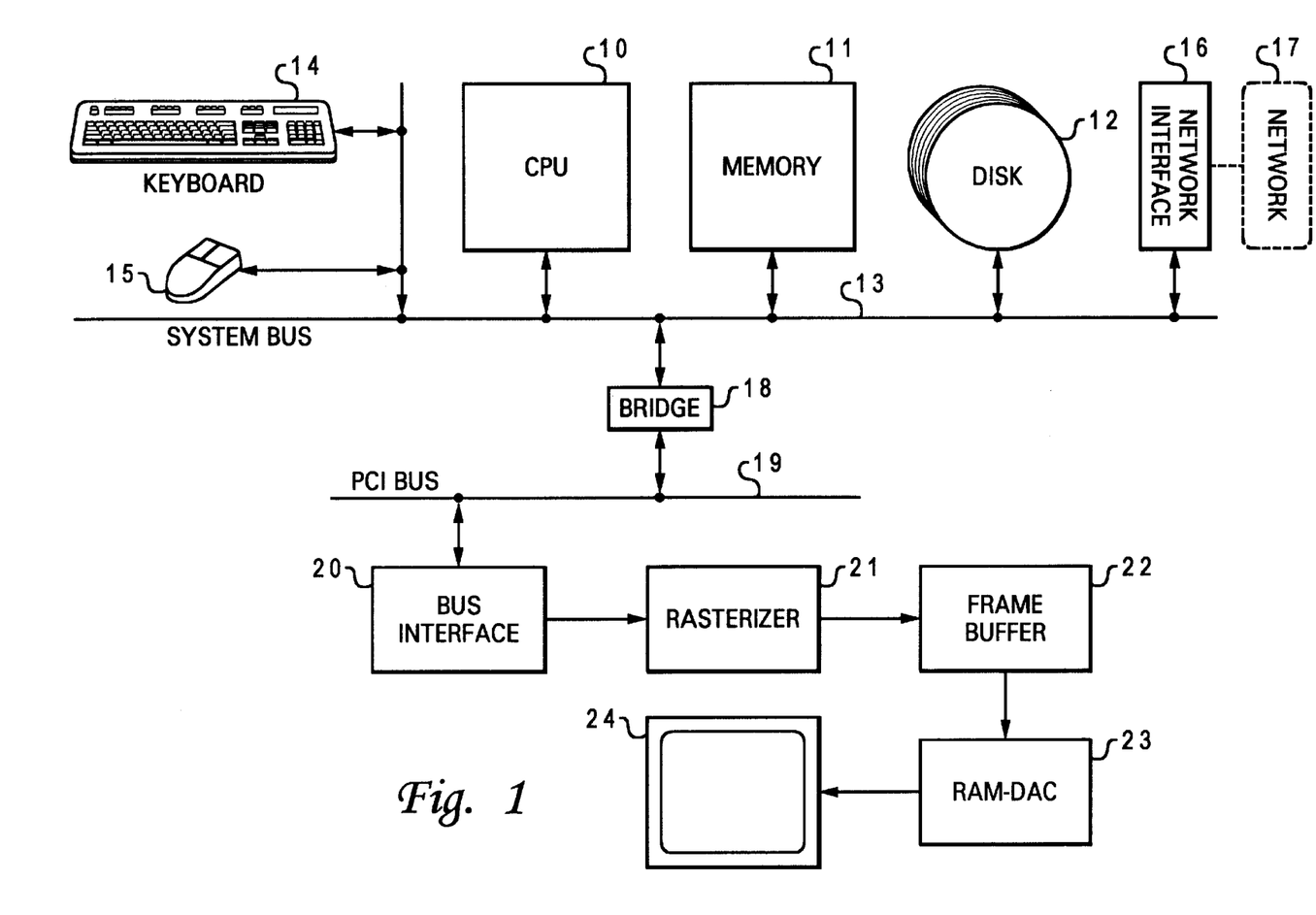
FIG. 1 is an electrical diagram in block form of a computer system which may use the graphics interface features of one embodiment of the present invention.

Referring to FIG. 1, a computer system is shown which has a graphics display output that may utilize the dual FIFO bus interface features of the invention. The computer system includes a CPU 10, main (physical) memory 11, and disk storage 12, interconnected by a system bus 13. Other peripherals such as a keyboard 14, mouse 15, and adapter card 16 for interface to a network 17 are included in the computer system. The graphics subsystem is connected to the CPU and memory via a bridge 18 and PCI bus 19. This is just an example of one embodiment of a computer system and bus arrangement; features of the invention may be used in various system configurations. The graphics subsystem includes a bus interface chip 20 described in detail below, connected to the PCI bus 19 to handle transfer of commands and data from the CPU and memory to the graphics subsystem. A rasterizer 21 generates pixel data for a bit-mapped image of the screen to be displayed, for storing in a frame buffer 22. The data stored in the frame buffer is read out via a RAMDAC or RAM and digital-to-analog converter 23 to a CRT display 24, for each screen update. The frame buffer 22 is bit-mapped to the screen of the display; each pixel of the display has a corresponding location in the frame buffer storing the definition of what is to be displayed for that one pixel when the raster scan is performed. This definition includes color, intensity, etc., and usually contains reference to palettes or tables for expanding the information to be displayed for the pixel. In addition, the pixel data may include information used to select between stereo or mono image in the particular part (window) of the display associated with this pixel.

Figure 2:
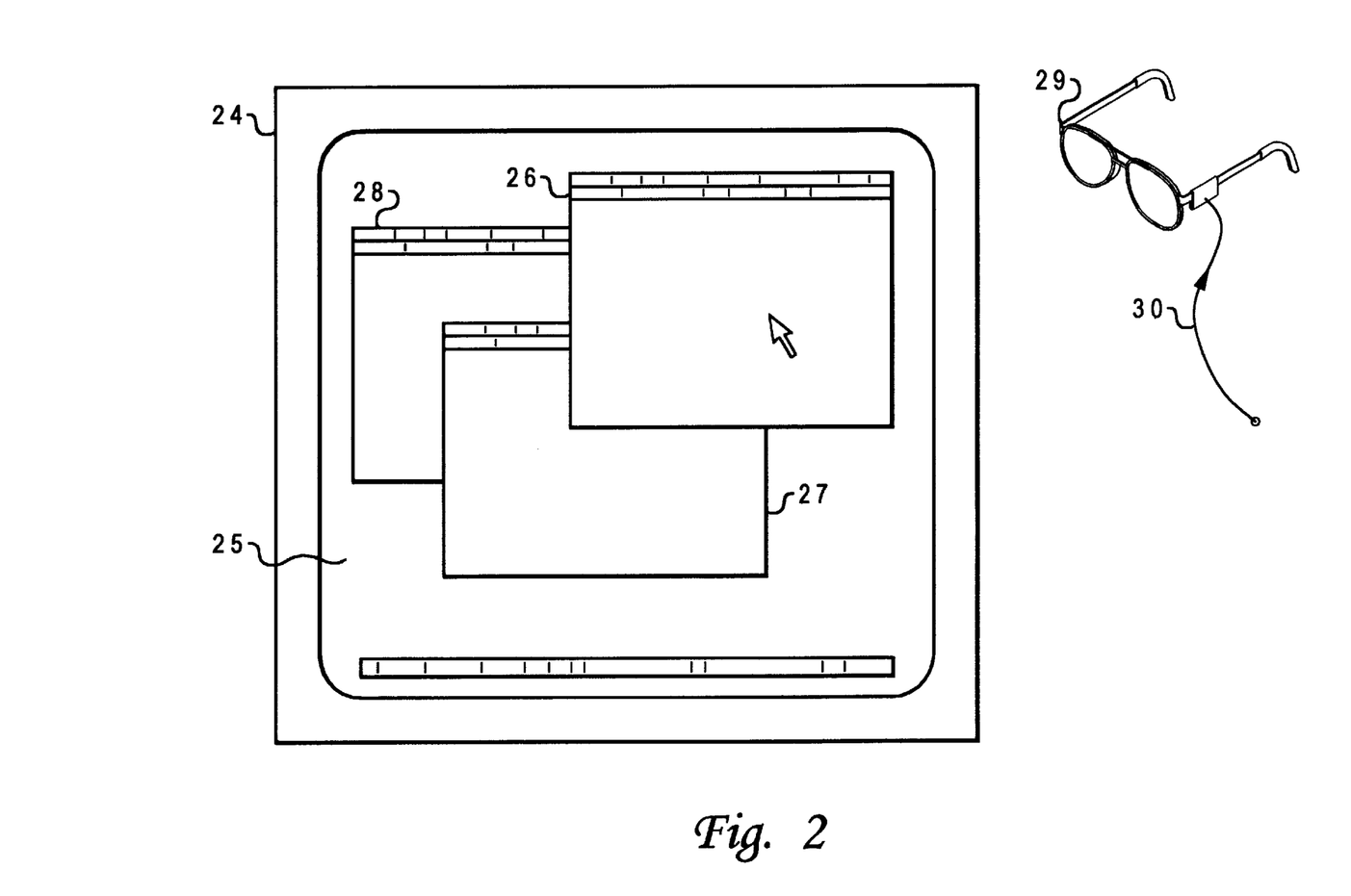
FIG. 2 is an enlarged view of the video display in the system of FIG. 1.

As seen in FIG. 2, the display 24 has a screen 25 which typically shows a number of windows 26, 27, and 28 for different processes or applications that are running at a given time on the computer system, as well as a cursor and various bars on the background of the screen, usually representing operating system information for X Windows, running under AIX, or the like. Some of the windows 26, 27, 28 may be 2D applications, some 3D, some stereo, etc. A 3D image may be displayed in mono, i.e., perspective views, or in stereo. A pair of specially-constructed glasses 29 is used when stereo viewing is activated. The lenses in these glasses function as electrically-operated shutters, so the user can see the screen 25 through only one side at a time. The shutters are cycled repetitively at the frame refresh rate, so the viewer sees alternate frames through left eye or right eye only. The cycling is controlled by the graphics subsystem of the computer via control line 30, to be in synch with the left-eye or right-eye data being displayed.

In order avoid tying up the busses 13 and 19, and using too much of the CPU time, the rasterizer 21 generates most of the pixel data to be stored in the frame buffer 22. The CPU generates graphics primitives which describe what is to be displayed in a higher-level or more abstract expression, and these are transferred via busses 13 and 19 and interface 20 to the rasterizer 21, which generates the pixel data. The bandwidth used by the output of the rasterizer is much greater than could be used on the busses 13 and 19 for video data. For example, a 1024×1024 color screen refreshed 50/sec., with 24-bits per pixel, requires a bandwidth of 150-Mbytes/sec., so the busses downstream of the rasterizer operate at this level, for screen data. A much lower bandwidth is dictated for transfers over the busses 13 and 19, in supporting the graphics subsystem from the CPU 10 and memory 11. According to the invention, the bus interface circuitry 20 is constructed to minimize PCI bus traffic.

Figure 3:
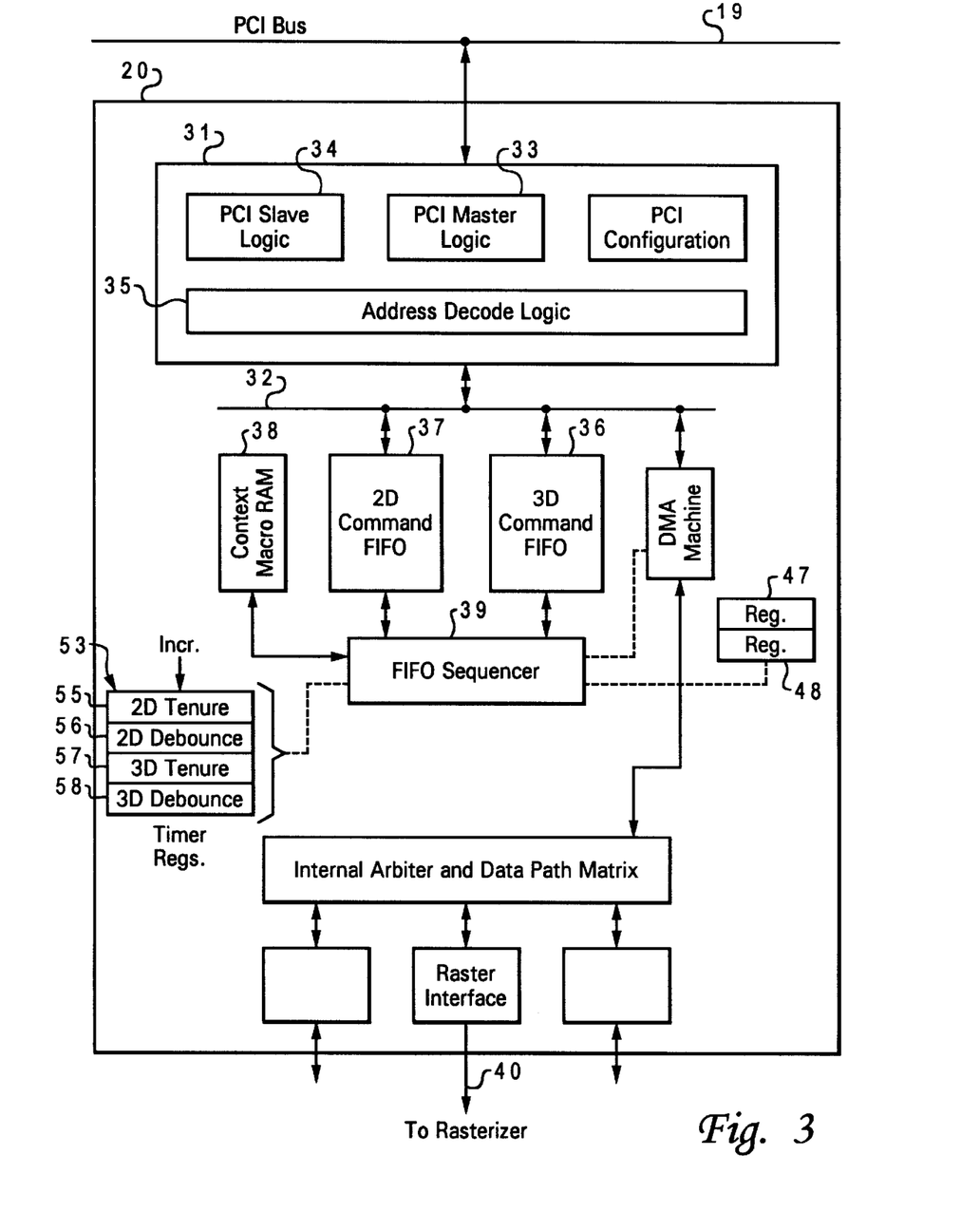
FIG. 3 is an electrical diagram in block form of the PCI interface in the graphics subsystem of FIG. 1, according to one embodiment.

Referring to FIG. 3, the PCI bus interface 20 is shown in detail. An interface 31 couples the PCI bus 19 to an internal bus 32, to allow the interface 20 to function as a standard PCI master and slave to DMA commands and data between the host CPU and memory and the bus 32. The interface 20 can act as a PCI master, using logic 33, to acquire the bus 19 and DMA data to locations in memory 11, and it can act as a PCI slave, using logic 34, to receive a DMA via the PCI bus from memory 11 directed to a location in the interface 20 such as the port to the rasterizer 21. Address decode logic 35 recognizes the addresses owned by the graphics subsystem, appearing on the PCI bus 19. The interface 31 parses the command stream on the PCI bus for its own commands, and forwards other graphics subsystem commands; for example, raster interface commands and data to the raster port for transfer to the rasterizer 21.

According to the invention, the PCI interface 20 contains a graphics context management arrangement including two command FIFOs 36 and 37. One command FIFO 36 is dedicated to 3D processes, and the other FIFO 37 is dedicated to 2D processes, actually window management and other host processes. These two FIFOs 36 and 37 are identical in function, being labelled 2D and 3D to indicate their intended usage. The 2D command FIFO 37 is assigned by software running on the host 10 to be used for the native window manager. The 3D command FIFO 36 is likewise assigned by software to be used for 3D drawing APIs and video. It is expected that 3D applications utilize only the 3D command FIFO 36, and that the 2D FIFO 37 is used by the window manager. Therefore, whenever the FIFO sequencer 39 stops processing commands from one command FIFO 36 or 37 and starts processing the other, there is an implied 2D-to-3D or 3D-to-2D context switch. The context save and context restore sequences are automatically executed. The pre-recorded sequence stored in the context macro RAM 38 allows the interface 20 to perform context saves and restores automatically upon switching of the command FIFO being used.

Data placed in these two FIFOs 36 and 37 by the host CPU 10 are operated on in the order in which there were written, so that the program's temporal order is preserved. There are two classes of data in FIFOs 36 and 37: commands to the PCI interface 20, and commands specific to other ports of the graphics pipeline, e.g., the raster port 40. The commands to the PCI interface 20 are executed by the FIFO sequencer 39 and removed from the stream; that is, they do not get passed on to the raster port 40. These commands to the PCI interface 20 are used to set up DMAs, modify the state of the interface 20, and issue context-related sequences. The commands specific to other parts of the graphics pipeline are passed on to the destination as specified by the host, unmodified by the PCI interface 20.

Figure 4:
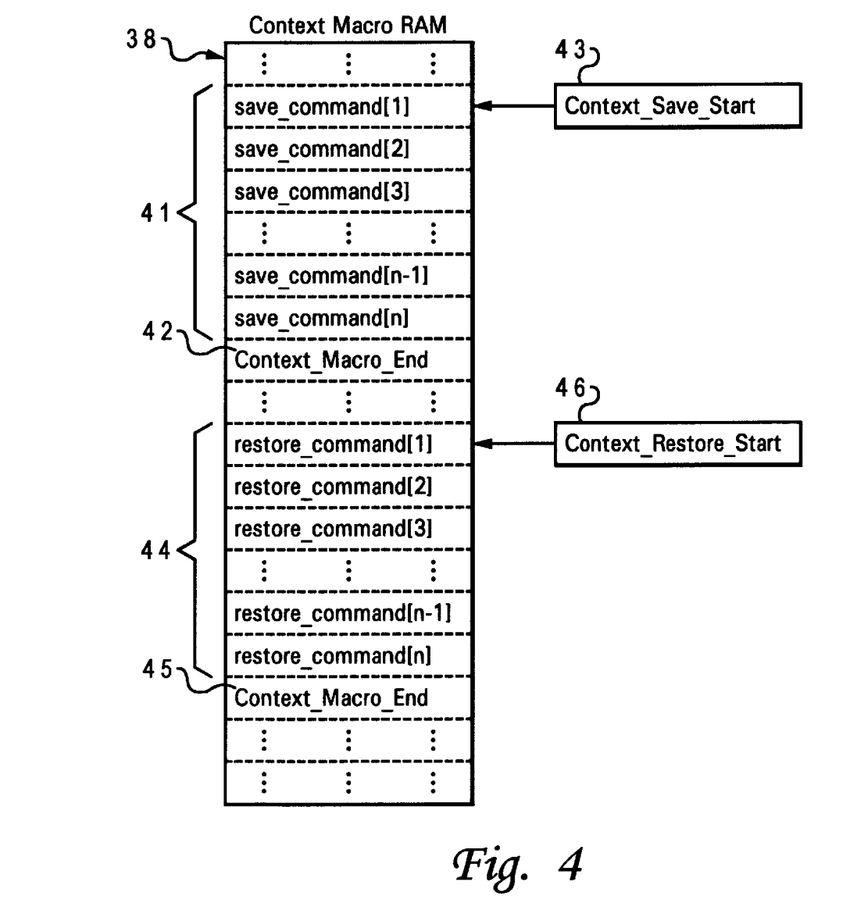
FIG. 4 is a more detailed diagram of the context macro RAM of FIG. 3.

Referring to FIG. 4, at initialization, the host CPU 10 loads the context macro RAM 38 with the sequence 41 for context save. The context macro RAM 38 can contain any command for the PCI interface 20 or data stream that is valid in the command FIFOs 36 and 37. A context macro end command 42 is also loaded into the RAM 38, which marks the end of the context save sequence. The host CPU 10 also loads a context save start register 43 with the address of the first element of the context save sequence 41 it loaded into the RAM 38. Further, the host loads the RAM 38 with the sequence 44 for context restore. A context macro end command 45 is loaded again into the RAM 38, this time marking the end of the context restore sequence. And, the host CPU 10 also loads a context restore start register 46 with the address of the first element of the context restore sequence 44 it loaded into the RAM 38.

Since this implied context switch sequence just described is removed from the host, it has no opportunity to provide the initial DMA addresses for the context save and restore sequences. Therefore registers 47 and 48 are provided to hold a context 2D pointer and a context 3D pointer. At initialization time, the host CPU 10 pins and maps two buffers in system memory 11; each is large enough to hold a graphics context, e.g., perhaps 4K-byte. These two registers 47 and 48 are loaded with the starting address of these two buffers.

Figure 5:
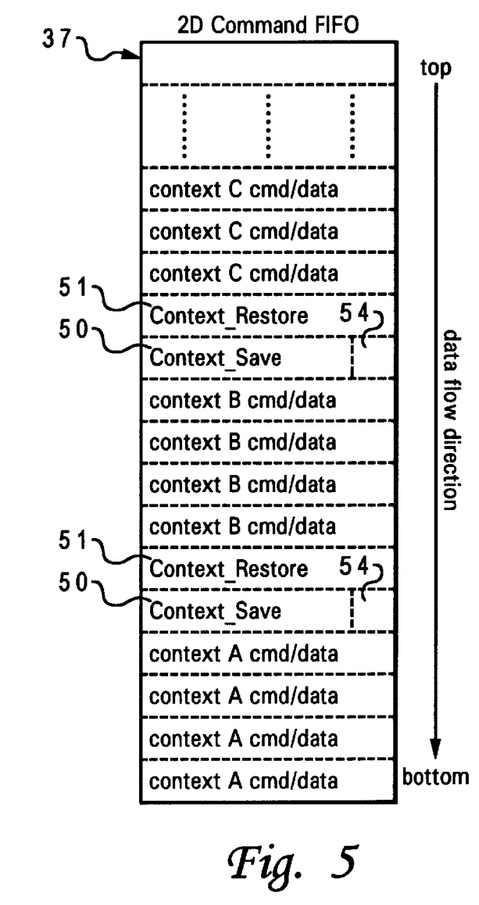
FIG. 5 is a more detailed diagram of one of the command FIFOs of FIG. 3.

In FIG. 5, an example of contents of one of the command FIFOs 36 and 37 is illustrated. The operation is first explained as if only one command FIFO were present. This FIFO is seen to contain commands/data for context processes "A," "B," and "C," with context save and restore commands 50 and 51 at the end and beginning of each context sequence. The FIFO sequencer 39 fetches and executes all of the commands/data for the context process "A" in the command FIFO 37, one by one. When the FIFO sequencer 39 executes a context save command 50, it begins execution from the context macro RAM 38; execution begins at the element pointed to by the context save start register 43, and continues to execute the sequence in the RAM 38 and stops only when a context macro end command 42 is executed. Next, the FIFO sequencer 39 starts executing commands in the command FIFO 37, and when it executes a context restore command 51, it begins executing the sequence in the macro RAM starting at the element pointed to by the context restore start register 46. The FIFO sequencer continues to execute the sequence in the RAM 38 and stops only when another context macro end command 42 is executed. Next, the FIFO sequencer 39 starts executing commands in the command FIFO 37 related to the next context process "B" and so on.

In this way the host CPU 10 can instruct the graphics subsystem PCI interface 20 to perform context switches by dispatching context save and context restore commands into command FIFOs 36 and 37, but need not reload all of the data stored locally in the macro RAM 38 each time. This saves time and system resources each time a context switch is necessary. Typically, the host CPU 10 manages switches from some 3D context to some other 3D context in this explicit manner. The context save and context restore commands 50 and 51 contain the system address of the initial DMA of the And as and these system addresses are managed by the host. And DMA command in the context macro RAM typically uses the relative mode of addressing. In the relative mode, the starting address is not supplied; the DMA will start at the ending address of the previous DMA incremented by 4-bytes. In this way, all DMAs in the context macro RAM 38 can be relative to its predecessor DMA. By using the DMA relative commands the graphics subsystem gathers the state into a contiguous host memory location during a context save. During a context restore the contiguous information is broken into multiple pieces and written to appropriate units in the graphics subsystem.

The previous explanation is for using one FIFO; a more complex operation is encountered in using the two FIFOs 36 and 37. The FIFO sequencer 39 monitors tenure timer registers 53, and automatically switches between execution from the two command FIFOs 36 and 37. Markers 54 in the FIFO data stream, referred to as end flags, indicate a potential cut point in the data stream, i.e., the preferred break points. If the end flag 54 is set and other conditions are met then the interface 20 will halt processing on the current command FIFO 36 or 37 and begin processing the other command FIFO 36 or 37., The 2D tenure timer register 55 typically determines the minimum amount of time that the 2D command FIFO 37 is active before processing switches to the 3D command FIFO 36. This register 55 and a 3D tenure timer register 57 regulate the frequency with which the implicit 2D-to-3D or 3D-to-2D context switches occur.

Writing to the register 55 sets the timer's initial value, TT2. When the 2D command FIFO becomes the active FIFO, the timer register 55 is automatically loaded with TT2 and it begins decrementing with ticks from the system clock. Only when the register 55 decrements to zero or the 2D command FIFO 37 goes empty can a potential switch to the 3D command FIFO occur. When the 2D command FIFO 37 is again made the active FIFO, the 2D tenure timer register 55 is automatically reloaded with TT2.

If the 2D command FIFO 37 is the active FIFO AND it has processed a command with the end flag 54 enabled AND the 2D command FIFO 37 goes empty AND the 3D command FIFO 36 is NOT empty, regardless of the value of the 2D tenure timer register 55, there will be an implicit context switch to the 3D command FIFO 36. An implicit context switch will occur even if the 2D command FIFO 37 is empty for as little as one clock. In order to prevent this FIFO thrashing, a 2D debounce timer register 56 is employed. When the conditions described at the beginning of this paragraph are met, the currently active 2D command FIFO 37 must remain empty for at least the time specified in this register 56 before the implied context switch can occur.

When the 2D command FIFO 37 goes empty AND an end flag 54 has been reached AND the 2D tenure timer register 55 has not expired, the 2D debounce timer register 56 starts to decrement. If this register 56 decrements to zero and the 2D command FIFO 37 is still empty AND the 3D command FIFO is NOT empty, then an implied context switch will occur. If the 2D command FIFO 37 becomes NOT empty before the 2D debounce timer register reaches zero, then the 2D debounce timer register 56 is halted and reloaded with its initial value.

The 3D tenure timer register 57 and 3D debounce timer register 58 are the same as the 2D tenure timer and debounce registers. Their operation is identical, except that they apply to the operation of the 3D command FIFO 36.

Figure 6:
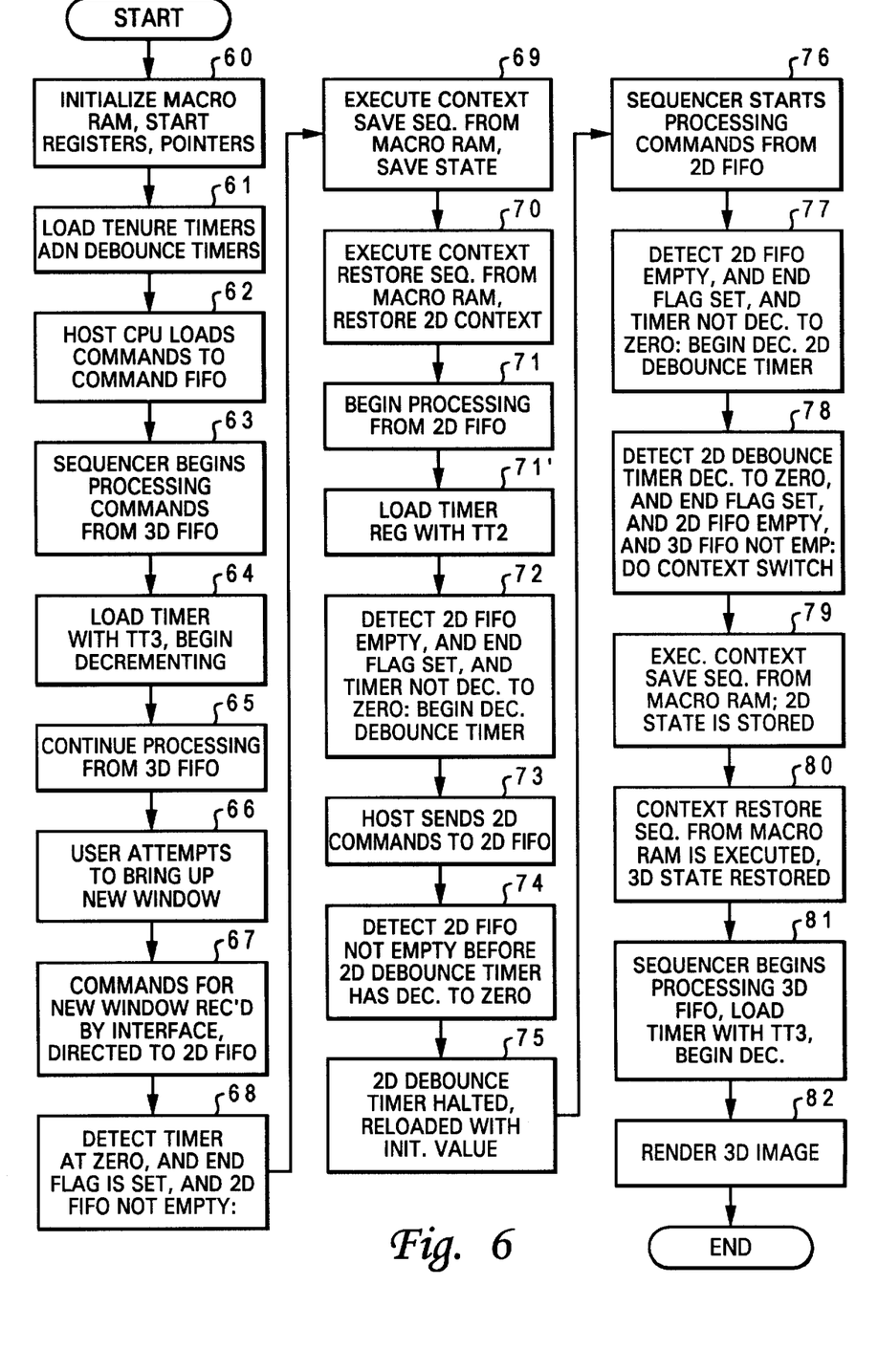
FIG. 6 is a logic flow chart of a method used in implicit context switches in the graphics subsystem of FIGS. 1–5, according to one embodiment of the invention.

An example of a 3D-to-2D implied context switch, followed by a 2D-to-3D implied context switch, will now be given, with reference to the flow chart of FIG. 6. First, the context macro RAM 38, the context save and restore start registers 43 and 46, and the context 2D and 3D pointers 47 and 48 are initialized, indicated by block 60 in FIG. 6. Then, the tenure timer registers 55 and 57, and the debounce timer registers 56 and 58 are loaded with initial values, indicated by block 61. The sequence of steps in the example is as follows:

The 2D command FIFO 37 is empty. The host CPU 10 is dispatching commands for the rendering of a high quality 3D scene, block 62. The FIFO sequencer 39 begins processing 3D command FIFO 36, block 63. When the 3D command FIFO 36 becomes the active FIFO, the 3D timer register 57 is automatically loaded with TT3, and begins decrementing, block 64.

While the 3D command FIFO 36 is active and the 3D scene is being rendered in one of the windows 26, 27, 28, block 65, the user attempts to bring up a new window, block 66.

The host CPU 10 dispatches a set of commands to the PCI interface 20 to draw the new window, and these commands are directed to the 2D command FIFO 37, block 67.

When the 2D timer 55 decrements to zero AND the end flag 54 is set AND the 2D command FIFO 37 is not empty, the FIFO sequencer 39 does an implicit context switch to the 2D command FIFO 37 even though the 3D command FIFO 36 is not empty, block 68. The context save sequence stored in the context macro RAM 38 is executed and the current 3D graphics subsystem state is stored in a buffer in system memory 11 with a starting address pointed to by the register 48, block 69. Next, the context restore sequence stored in the context macro RAM 38 is executed and the 2D context graphics subsystem state is restored from a buffer in system memory 11 whose starting address is pointed to by the context 2D pointer register 47, block 70.

The FIFO sequencer 39 begins processing the 2D command FIFO 37, block 71. When the 2D command FIFO 37 becomes the active FIFO, the timer register 55 is automatically loaded with TT2, and begins decrementing, block 71'.

When the 2D command FIFO 37 goes empty AND the last command processed had the end flag 54 set AAD the timer 55 has not decremented to zero, the 2D debounce timer 56 begins to decrement, block 72.

The host CPU 10 dispatches some more 2D context related commands that are directed towards the 2D command FIFO 37, block 73, which then becomes NOT empty before the 2D debounce timer 56 has decremented to zero, block 74. This debounce timer is halted and reloaded with its initial value, block 75. The FIFO sequencer 39 starts processing the commands in the 2D command FIFO 37, block 76.

When the 2D command FIFO 37 goes empty AND the last command had the end flag 54 set AND the timer 55 has not decremented to zero, the 2D debounce timer 56 begins to decrement, block 77.

When the 2D debounce timer 56 has decremented to zero AND the end flag 54 is set AND the 2D command FIFO 37 is still empty AND the 3D command FIFO 36 is not empty, the FIFO sequencer 39 does an implicit context switch to the 3D command FIFO 36, block 78. The context save sequence stored in the context macro RAM 38 is executed and the current 2D graphics subsystem state is stored in a buffer in system memory 11 whose starting address is pointed to by the context 2D pointer register 47, block 79. Next, the context restore sequence stored in the context macro RAM 38 is executed and the 3D graphics subsystem state is restored from a buffer in system memory 11 whose starting address is pointed to by the context 3D pointer register 48, block 80.

The FIFO sequencer begins processing the 3D command FIFO 36, block 81. When the 3D command FIFO 36 becomes the active FIFO, the 3D timer register 57 is automatically loaded with TT3, and begins decrementing, block 81.

The rendering of the high quality 3D scene continues, block 82.

This example illustrates that the use of two command FIFOs and the implementation of the implied context switch make it possible for the graphics subsystem to bring up a new window when requested by the user, while the high quality 3D scene was being rendered in another window.

While the invention has been shown and described with reference to a particular embodiment, it will be understood that various changes in form and detail of the preferred embodiment, as well as other embodiments of the invention, may be made by those skilled in the art without departing from the true spirit and scope of the invention.

What is claimed is:

1. A graphics system for a data processing system including a host processor and a graphics display, the host processor generating commands and data for image display, said graphics system comprising:

a first FIFO receiving and storing commands and data from said host processor for 2D images;

a second FIFO receiving and storing commands and data from said host processor for 3D images; and means for receiving said commands and data from said first and said second FIFOs and for generating pixel data for driving said graphics display.

2. A system according to claim 1 including a macro store for locally storing commonly-used commands.

3. A system according to claim 1 including a control mechanism for automatically switching between use of said first and second FIFOs for commands and data for said converter.

4. A system according to claim 3 wherein said control mechanism includes a first tenure timer for the first FIFO and a second tenure timer for said second FIFO.

5. A system according to claim 4 including a first debounce timer for the first FIFO and a second debounce timer for said second FIFO.

6. A system according to claim 1 including:

a macro store for locally storing commonly-used commands stored in said FIFOs; and a timer mechanism for automatically switching between use of said first and second FIFOs for commands and data for said converter.

7. A system according to claim 1, and further comprising a sequencer interposed between said first and second FIFOs and said means, wherein said sequencer processes commands and data from one of said first and second FIFOs associated with an active context, and wherein said sequencer removes display commands and data from one of said first FIFO and said second FIFO associated with said active context and passes said display commands and data to said means.

8. A system according to claim 7, and further comprising a macro store, coupled to said sequencer, for locally storing a context switch macro executed by the sequencer to switch which of said first FIFO and said second FIFO is processed.

9. A system according to claim 8, said sequencer executing said context switch macro responsive to processing a context switch command received in one of said first FIFO and said second FIFO from said host processor.

10. A system according to claim 8, said sequencer executing said context switch macro responsive to a predetermined condition set.

11. A system according to claim 10, said predetermined condition set including the one of said first and second FIFOs associated with the active context being empty.

12. A system according to claim 7, and further comprising an interconnect interface coupling said first FIFO and said second FIFO to an interconnect, wherein said commands in said first FIFO and said second FIFO include both display commands for controlling image display and interconnect commands for controlling communication on said interconnect.

13. A method according to claim 1, and further comprising:

selecting one of said first FIFO and said second FIFOs for processing;

removing display commands and data from the selected one of said first FIFO and said second FIFO and passing said display commands and data to a pixel data generator for processing.

14. A method according to claim 13, and further comprising locally storing a context switch macro executed to switch which of said first FIFO and said second FIFO is selected for processing.

15. A method according to claim 14, and further comprising executing said context switch macro responsive to processing a context switch command received in one of said first FIFO and said second FIFO from said host processor.

16. A method according to claim 14, and further comprising executing said context switch macro responsive to a predetermined condition set.

17. A method according to claim 16, said predetermined condition set including the one of said first and second FIFOs selected for processing becoming empty.

18. A method according to claim 13, said data processing system further comprising an interconnect interface coupling said first FIFO and said second FIFO to an interconnect, wherein said commands in said first FIFO and said second FIFO include both display commands for controlling image display and interconnect commands for controlling communication on said interconnect.

19. A method for operating a data processing system having a host processor and a graphics display, said method comprising the steps of:

generating commands and data in the host processor for image display;

receiving and storing commands and data for 2D images from said host processor in a first FIFO;

receiving and storing commands and data for 3D images from said host processor in a second FIFO; and in response to receipt of said commands and data from either of said first FIFO or said second FIFO, generating pixel data for driving said graphics display.

20. A method according to claim 19 including locally storing in a macro store commonly-used commands.

21. A method according to claim 19 including automatically switching between use of said first and second FIFOs for commands and data used for said converting.

22. A method according to claim 21 wherein switching is responsive to a first tenure timer for the first FIFO and a second tenure timer for said second FIFO.

23. A method according to claim 22 wherein said switching is responsive to a first debounce timer for the first FIFO and a second debounce timer for said second FIFO.

24. A method according to claim 19 including:

locally storing in a macro store commonly-used commands for said FIFOs; and automatically switching between use of said first and second FIFOs for commands and data.

25. A data processing system, comprising:

a host processor that generates commands and data for image display, said commands and data including commands and data for 2D images and commands and data for 3D images;

at least one interconnect coupled to the host processor;

a graphics system coupled to the at least one interconnect, said graphics system including:

a first FIFO receiving and storing commands and data for 2D images from said host processor;

a second FIFO receiving and storing commands and data for 3D images from said host processor; and a pixel data generator that, responsive to receipt of said commands and data from said first and second FIFOs, generates pixel data for driving a graphics display.

26. A system according to claim 25 and further comprising the graphics display.

27. A system according to claim 25, and further comprising a sequencer interposed between said first and second FIFOs and said pixel data generator, wherein said sequencer processes commands and data from one of said first and second FIFOs associated with an active context, and wherein said sequencer removes display commands and data from one of said first FIFO and said second FIFO associated with said active context and passes said display commands and data to said pixel data generator.

28. A system according to claim 27, and further comprising a macro store, coupled to said sequencer, for locally storing a context switch macro executed by the sequencer to switch which of said first FIFO and said second FIFO is processed.

29. A system according to claim 28, said sequencer executing said context switch macro responsive to processing a context switch command received in one of said first FIFO and said second FIFO from said host processor.

30. A system according to claim 28, said sequencer executing said context switch macro responsive to a predetermined condition set.

31. A system according to claim 30, said predetermined condition set including the one of said first and second FIFOs associated with the active context being empty.

* * * * *

UNITED STATES PATENT AND TRADEMARK OFFICE
CERTIFICATE OF CORRECTION

PATENT NO. : 6,252,600 B1
DATED : June 26, 2001
INVENTOR(S) : Kohli et al.

It is certified that error appears in the above-identified patent and that said Letters Patent is hereby corrected as shown below:

Column 3,
Line 4, please insert -- , -- after the word -- restore --;

Column 5,
Line 5, please delete "," after the number "20";

Column 6,
Line 8, please insert the word -- sequence, -- after the word "the";
Line 8, please delete the words "And as" after the word "sequence,";
Line 9, please delete the word "And" and add the word -- A -- after the word "host.";
Line 15, please insert -- , -- after the word "commands";
Line 27, please insert -- , -- after the word "met";
Line 30, please delete "," after the numeral "37" and add -- . -- after the numeral "37";

Column 7,
Line 11, please delete "," after the numeral "57";
Line 36, please insert -- , -- after the word "executed";
Line 40, please insert -- , -- after the word "executed";
Line 50, please delete "AAD" and insert -- AND --;

Column 8,
Line 5, please insert -- , -- after the word "executed";
Line 10, please insert -- , -- after the word "executed";
Line 47, please delete "use of";
Line 48, please insert -- as a source of -- after the word "FIFOs";
Line 48, please delete "for" after the word "FIFOs";
Line 49, please delete "converter" and add -- means. --

Signed and Sealed this

Twenty-seventh Day of August, 2002

*Attest:*

JAMES E. ROGAN
*Attesting Officer*     *Director of the United States Patent and Trademark Office*